(12) United States Patent
Morozumi et al.

(10) Patent No.: US 12,069,486 B2
(45) Date of Patent: Aug. 20, 2024

(54) METHOD AND SYSTEM THAT INCLUDE MAKING A COMMUNICATION NETWORK

(71) Applicant: T&D CORPORATION, Matsumoto (JP)

(72) Inventors: Akio Morozumi, Matsumoto (JP); Chiaki Segi, Matsumoto (JP); Kanato Kobayashi, Matsumoto (JP)

(73) Assignee: T&D CORPORATION, Matsumoto (JP)

( * ) Notice: Subject to any disclaimer, the term of this patent is extended or adjusted under 35 U.S.C. 154(b) by 364 days.

(21) Appl. No.: 17/487,492

(22) Filed: Sep. 28, 2021

(65) Prior Publication Data

US 2022/0070685 A1 Mar. 3, 2022

Related U.S. Application Data

(63) Continuation of application No. PCT/JP2020/013907, filed on Mar. 27, 2020.

(30) Foreign Application Priority Data

Mar. 28, 2019 (JP) ................. 2019-064041

(51) Int. Cl.
*H04W 16/18* (2009.01)
*H04W 84/18* (2009.01)

(52) U.S. Cl.
CPC ............ *H04W 16/18* (2013.01); *H04W 84/18* (2013.01)

(58) Field of Classification Search
CPC ...... H04W 16/18; H04W 84/18; H04B 15/00; H04B 17/318; H02J 50/10; H04N 1/32797; H05B 37/0272
See application file for complete search history.

(56) References Cited

U.S. PATENT DOCUMENTS 10,735,937 B2 * 8/2020 Shiihara ................ H04W 8/005
11,470,460 B2 * 10/2022 Miyabayashi .......... H04W 4/80
(Continued)

FOREIGN PATENT DOCUMENTS

CN 105556864 A * 5/2016 ............. H02J 50/10
JP 2008-294944 A 12/2008
(Continued)

OTHER PUBLICATIONS

Sep. 28, 2021 Preliminary Report issued in International Patent Application No. PCT/JP2020/013907.
(Continued)

*Primary Examiner* — Ayaz R Sheikh
*Assistant Examiner* — Louis Samara
(74) *Attorney, Agent, or Firm* — Oliff PLC (57) ABSTRACT

A system and method that generate a first sensor network of first communication apparatuses that include first communication units to transmit communication messages to form the first sensor network and second communication units. The first sensor network is formed by acquiring identification information of the communication apparatuses via second communication units that are general-purpose communication units in substantially parallel communication, and selecting by a first information processing apparatus two or more of the plurality of first communication apparatuses. The first setting information is transmitted to the second communication units such that the selected first communication apparatuses communicate to form the first sensor network.

14 Claims, 6 Drawing Sheets

(56) References Cited

U.S. PATENT DOCUMENTS

| | | | |
|---|---|---|---|
| 2016/0007351 A1* | 1/2016 | Shiotani | H04B 15/00 370/329 |
| 2017/0367128 A1* | 12/2017 | Ito | H04W 76/10 |
| 2018/0270382 A1* | 9/2018 | Asai | H04N 1/32797 |

FOREIGN PATENT DOCUMENTS

| | | | | |
|---|---|---|---|---|
| JP | 2008294944 A | * | 12/2008 | |
| JP | 2016-015572 A | | 1/2016 | |
| JP | 2016015572 A | * | 1/2016 | H04B 15/00 |
| JP | 2019-024161 A | | 2/2019 | |
| JP | 2020017922 A | * | 1/2020 | |
| KR | 20180095682 A | * | 8/2018 | H04B 17/318 |
| KR | 20190025509 A | * | 3/2019 | Y02B 20/40 |
| WO | WO-2020022390 A1 | * | 1/2020 | |

OTHER PUBLICATIONS

Jun. 9, 2020 International Search Report issued in International Patent Application No. PCT/JP2020/013907.

Jun. 9, 2020 Written Opinion issued in International Patent Application No. PCT/JP2020/013907.

* cited by examiner

METHOD AND SYSTEM THAT INCLUDE MAKING A COMMUNICATION NETWORK

TECHNICAL FIELD

The present invention relates to a method and system that include making a communication network.

BACKGROUND ART

As a communication apparatus that facilitates operations for setting up data transmits and has a low processing load, Japanese Laid-open Patent Publication No. 2019-24161 discloses a communication apparatus including: receiving means for receiving, from devices connected to a wireless sensor network where communication is performed according to 6LoWPAN, confirmation messages for confirming whether there is another device on the network with the same address as a first address that each device intends to use; determination means for determining, when confirmation messages have been received by the receiving means, whether another device with the same address as a first address exists in the network; notification means for notifying each device of the result of the determination by the determination means as a response to each confirmation message; and first setting means for making transmit settings for data transmitted by each device during a period until the receiving means receives the confirmation messages and the notification means gives notification of the result of the determination by the determination means as a response to the confirmation messages.

SUMMARY OF INVENTION

There is demand for an easier way for users to independently or individually make or build wireless communication networks, such as a wireless sensor network.

One aspect of the present invention is a method that includes generating a first sensor network of a plurality of first communication apparatuses selected from a plurality of communication apparatuses, the plurality of communication apparatuses respectively including a plurality of first communication units to transmit communication messages to form the first sensor network and a plurality of second communication units. The second communication units are general-purpose communication units configured to communicate with an information processing apparatus (an information processing apparatus that acts as a host, or host PC). The generating of the first sensor network includes the following steps:
1. Acquiring identification information of the plurality of communication apparatuses (identification information for each of the plurality of communication apparatuses) via the second communication units;
2. Selecting two or more of the plurality of first communication apparatuses using the acquired identification information of the plurality of communication apparatus for generating first setting information for each of the selected first communication apparatuses; and
3. Transmitting the first setting information to the respective second communication units of the selected two or more first communication apparatuses, such that the selected two or more first communication apparatuses are configured to communicate using the respective first communication units with other first communication apparatuses of the plurality of first communication apparatuses to form the first sensor network.

The communication apparatus in which the first setting information is set is for example a highest-level communication apparatus capable of managing the first communication network, and is sometimes referred to as a "base unit" or "master unit". In a distributed communication network or the like, the first setting information may be set in the plurality of communication apparatuses respectively.

The method may further include communication of the plurality of communication apparatuses that belong to the first communication network, using the first communication units according to the first setting information. The second communication units may be units that enable the plurality of communication apparatuses to communicate with the first information processing apparatus substantially in parallel. Acquiring the identification information may include communication of the plurality of communication apparatuses substantially in parallel with the first information processing apparatus.

By providing necessary information from each communication apparatus equipped with a second communication unit capable of communication using wireless LAN, BLE (Bluetooth (registered trademark) Low Energy), or the like which is provided as standard in the first information processing apparatus (which is not limited to a notebook PC or the like and as examples may be a tablet terminal or a smartphone terminal) to the first information processing apparatus that functions as the host, it is possible to virtually make or construct a communication network with the communication apparatuses on the first information processing apparatus. By feeding back the information on the virtually made communication network from the first information processing apparatus via the second communication unit to the one or more communication apparatuses that control the communication network, it is possible to easily make or construct a low-power communication network with the first communication units that are not installed as standard in the first information processing apparatus. Examples of the first communication units that are not installed as standard in an information processing apparatus, such as a PC, are such as specified low-power wireless communication and ZigBee (registered trademark) that are easy to customize and have low power consumption. By using these first communication units, it is possible to easily construct a low power communication network that is suited to a sensor network or the like.

The step of virtually constructing the first communication network may include displaying a plurality of icons that respectively represent the plurality of communication apparatuses on the first information processing apparatus and making the virtual first communication network using the plurality of icons by dragging and dropping the plurality of icons. The plurality of communication apparatuses may include one or more remote units (slave units) that provide measurement data acquired from respective sensors via a base unit that connects to the cloud, and one or more repeaters capable of relaying between the base unit and the one or more remote units. By doing so, a wireless sensor network (WSN) can be constructed in a short time. The step of virtually making the first communication network may include making a communication network including a base unit.

Another aspect of the present invention is a non-transitory computer readable storage medium storing a computer executable program (program product) for controlling an information processing apparatus capable of communicating with a plurality of communication apparatuses via second communication units that are general-purpose communication units. The plurality of communication apparatuses respectively include first communication units that transmit communication messages to form a sensor network. The program includes instructions that cause the information processing apparatus to execute: acquiring of identification information of the plurality of communication apparatuses via the second communication units that communicate in substantially parallel communication; selecting two or more of the plurality of first communication apparatuses using the identification information of the plurality of communication apparatus for generating first setting information for each of the selected first communication apparatuses; and transmitting first setting information to the respective plurality of second communication units of the selected two or more first communication apparatuses, such that the selected two or more first communication apparatuses are configured to communicate using the respective first communication units with other first communication apparatuses of the plurality of first communication apparatuses to form the sensor network.

Yet another aspect of the present invention is a system including a plurality of communication apparatuses that respectively include first communication units for transmitting communication messages to form a first sensor network and a plurality of second communication units. A first information processing apparatus including a processor, which connects to the plurality of communication apparatuses respectively using second communication units respectively provided in the plurality of communication apparatuses. The first information processing apparatus performing acquiring identification information of the plurality of communication apparatuses via the plurality of second communication units that are general-purpose communication units, which are configured to communicate with the first information processing apparatus in substantially parallel communication; selecting two or more of the plurality of first communication apparatuses using identification information of the plurality of communication apparatuses for generating first setting information for each of the selected first communication apparatuses; and transmitting the first setting information to the respective second communication units of the selected two or more first communication apparatuses, such that the selected two or more first communication apparatuses are configured to communicate using the respective first communication units with other first communication apparatuses of the plurality of first communication apparatuses to form the first sensor network. In this system, it is possible for a plurality of communication apparatuses to easily construct or make a first communication network where communication is performed using first communication units according to the first setting information.

The function of virtually making the first communication network may include: a function of displaying a plurality of icons that respectively represent the plurality of communication apparatuses on the first information processing apparatus; and a function of constructing the virtual first communication network using the plurality of icons by dragging and dropping the plurality of icons.

The plurality of communication apparatuses may include a remote unit (slave unit) that provides measurement data acquired from a sensor via a base unit capable of connecting to a cloud and a repeater capable of relaying between the base unit and the remote unit. The function of virtually making the first communication network may include a function of making a communication network including a base unit. The first communication units may include functions that perform specified low-power wireless communication, and the second communication units may include functions that performs BLE communications. The first information processing apparatus that acts as the host may be a notebook PC, a tablet terminal, or a smart phone terminal.

Yet another aspect of the present invention is a communication apparatus that includes a first communication unit that transmits communication messages to other communication apparatuses to form a sensor network. The communication apparatus includes: a second communication unit that is a general-purpose communication units and connects to a first information processing apparatus, which includes a processor, together with the plurality of communication apparatuses in substantially parallel communication; and a communication network configuration unit configured to transmit identification information of the communication apparatus to the first information processing apparatus using the second communication unit, acquire first setting information for communicating with other communication apparatuses, which is based on the communication apparatus being selected on the first information processing apparatus, and set the first setting information in the first communication unit to form the sensor network.

DESCRIPTION OF EMBODIMENTS

Figure 1:
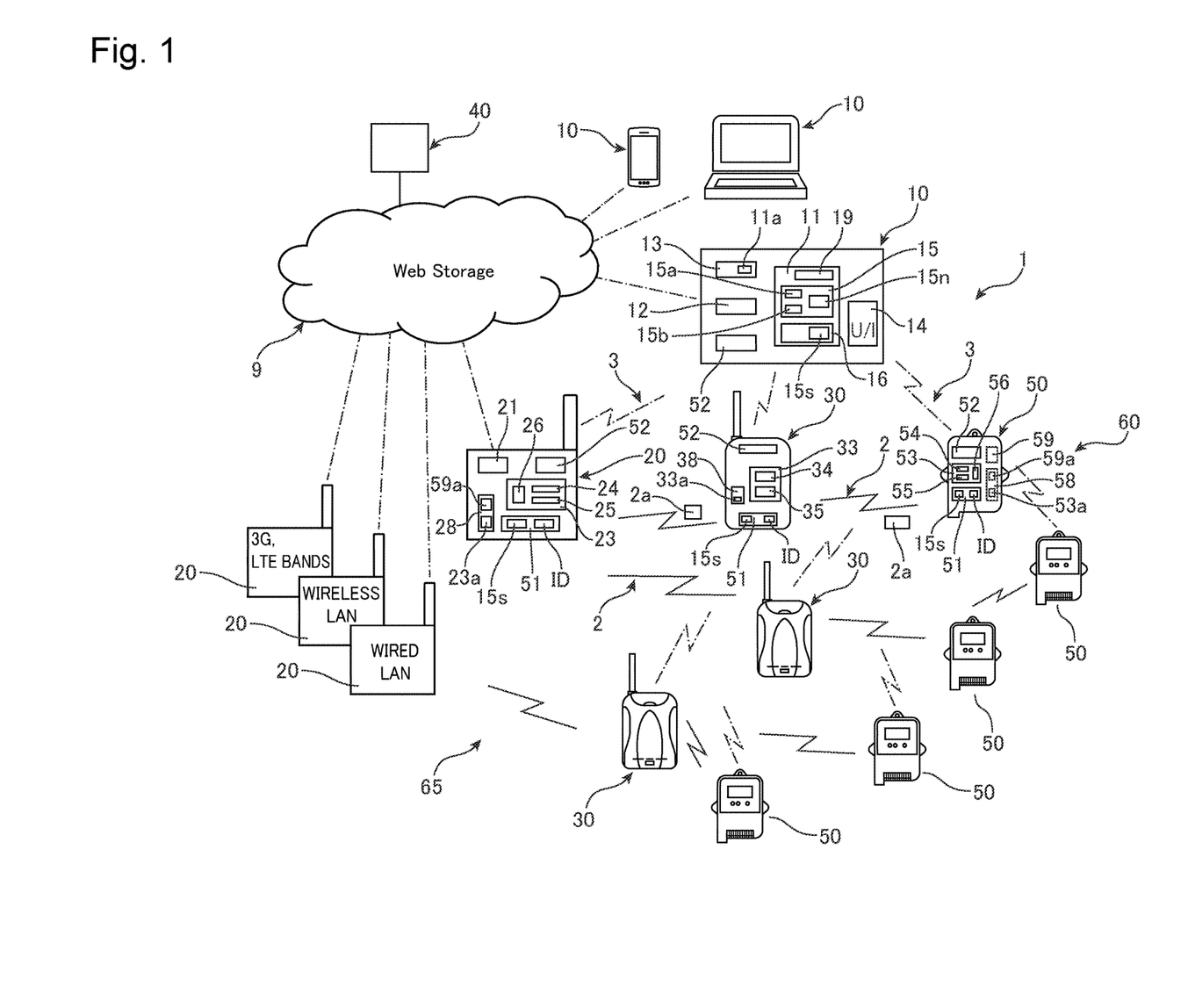
FIG. 1 is a block diagram depicting a system that makes a network including a plurality of communication apparatuses.

FIG. 1 depicts a system 1 that makes (constructs, configures) a wireless sensor network (WSN) 65. The WSN 65 includes a plurality of communication apparatuses 60 that respectively include first communication units 51 that transmit or transfer communication messages while relaying communication to and from other communication apparatuses. The plurality of communication apparatuses 60 include remote units (slave units, child units) 50 that provide measurement data acquired from a built-in or external sensor 59 via a base unit (master unit, parent unit) 20 that are capable of connecting to a cloud 9 and repeaters 30 capable of relaying communication between the base unit 20 and the remote units 50. Note that in the following description, the building or making of a communication network (first communication network) 65 composed of the communication apparatuses 60 including a base unit 20, that is, the base unit 20, the repeaters 30, and the remote units 50, will be described.

The system 1 includes the plurality of communication apparatuses 60 which each have a first communication unit 51 that transmits communication messages while relaying communication to and from other communication apparatuses 60 (in the present embodiment, via the base unit 20 and/or the repeaters 30). The system 1 further includes a host PC (first information processing apparatus) 10 that is capable of connecting to the plurality of communication apparatuses 60 substantially in parallel using second communication units 52 provided in each of the plurality of communication apparatuses 60. The host PC 10 is provided with a function (feature, configuration, functional unit) 15 for virtually making (constructing, configuring) the first communication network 65 including the plurality of communication apparatuses 60 using identification information (sets of identification information) IDs for each of the plurality of communication apparatuses 60 which have been acquired via the second communication units 52 and a function (feature, configuration, functional unit) 16 that sets setting information (first setting information) 15s, which is used for communicating via the first communication unit 51 with other communication apparatuses according to a virtual first communication network 15n that has been virtually made, via the second communication units 52 in one or more communication apparatuses (for example, a base unit 20) that control the first communication network 65 out of the plurality of communication apparatuses 60. The setting function 16 may set the first setting information 15s in each of the plurality of communication apparatuses 60 that construct the first communication network 65. When making (configuring) a tree-type or a star-type network, it is possible to make a network even when the setting information 15s is set only in the base unit 20 located at the center. On the other hand, when making a distributed network, such as a ring-type or a mesh-type network, the setting information 15s may be set in all the communication apparatuses 60 that construct the network.

The remote units 50 are one type of communication apparatus 60 that constructs the first communication network 65 and transmit communication messages while relaying communication to and from other communication apparatuses 60, for example, the repeaters 30 or the base unit 20. The remote units 50 respectively include first communication units 51 and make the first communication network 65 via the first communication units 51. The remote units 50 respectively include second communication units 52, which are capable of connecting together with a plurality of communication apparatuses 60, that is, the base unit 20, the repeaters 30, and the other remote units 50 substantially in parallel to the host PC (first information processing apparatus) 10, and a communication network configuration unit 55 that is configured to provide the identification information ID of the remote unit 50 via the second communication unit 52 to the host PC 10. The communication network configuration unit 55 may include a function that acquires the setting information 15s for communicating with other communication apparatuses 60 according to a communication network 15n that includes the plurality of communication apparatuses and is virtually constructed at the host PC 10 and configures or sets the first communication unit 51 using the acquired setting information.

Each remote unit 50 includes a sensor 59 that measures temperature, humidity, or the like, a built-in memory 58 that records measured values (measurement data) 59a, a specified low-power (400 MHz) wireless communication unit that functions as the first communication unit 51, a BLE (2.4 GHz) communication unit that functions as the second communication unit 52, and a processor 53 that controls these elements. Together with the sensor 59 or in place of the sensor 59, the remote unit 50 may have an interface that is capable of connecting to an external sensor. The specified low-power wireless unit 51 is used to communicate with a base unit 20 or a repeater 30, and the BLE communication unit 52 is used to communicate with the host PC 10, such as a smartphone or a tablet terminal.

The specified low-power wireless communication unit 51 is used to transmit and upload communication messages 2a including the recorded data (measurement data) 59a of the remote unit 50 to a server 40 set up on the Internet 9 or another communication network, while relaying communication between the base unit 20 and the repeaters 30 that are other communication apparatuses, using specified low-power wireless communication 2. The specified low-power wireless communication unit 51 is also used to set recording conditions (measurement conditions) in the remote unit 50.

The BLE communication unit 52 communicates with the host PC 10 via wireless communication 3 according to a specification established as a part of Bluetooth (registered trademark) standard. The BLE communication unit 52 may be used to provide conditions (IDs, frequency channels) for making (constructing, forming) a sensor network 65 with communicating with the base units 20 and the repeaters 30 via the specified low-power wireless communication 2. The BLE communication unit 52 may be used to provide information (setting information) 15s for configuring the communication network 65.

Each remote unit 50 includes computer resources, including a memory 58 and a processor 53. The processor 53 implements predetermined functions by downloading a program (program product) 53a recorded in the memory 58, and operates as functional modules or functional units. The processor 53 provides a function as the communication network configuration unit 55. The communication network configuration unit 55 provides the identification information ID of the remote unit 50 to the host PC 10 via the BLE communication unit 52, which is the second communication unit. The communication network configuration unit 55 may acquire the setting information 15s, including information such as a frequency channel for communicating with other communication apparatuses according to the communication network (virtual communication network) 15n that includes the plurality of communication apparatuses 60 and has been virtually constructed at the host PC 10 and may set the setting information 15s in the specified low-power wireless communication unit 51, which is the first communication unit. The communication network configuration unit 55 may communicate via the specified low-power wireless communication unit 51 using a preset frequency channel, ID, and the like. By performing this processing, the remote unit 50 can make or join an actual communication network 65 which includes the repeaters 30 and the base unit 20 and can transmit messages 2a using the specified low-power wireless communication 2.

The processor 53 further includes or provides a measurement function 56, which periodically acquires measurement data 59a from the internal sensor 59 or an external sensor, and a communication function (communication control unit) 54 which transmits, using the specified low-power wireless communication unit 51, a message 2a including the measurement data 59a in response to a call from the base unit 20 or the repeater 30. The sensor 59 may be built-in or external, and may measure one physical quantity such as temperature, humidity, voltage, current, pulse, luminance, infrared intensity, and $CO_2$ concentration or may include a wide variety of sensors (that is, a plurality of sensors) that measure a plurality of physical quantities.

The communication function 54 uses the conditions 15s for making the communication network 65 that have been acquired via the BLE communication unit 52 or uses conditions that are set in advance to operate the specified low-power wireless communication unit 51 so as to communicate with other communication apparatuses 60 via low power communication. In more detail, the communication function 54 operates the specified low-power wireless communication unit 51 to communicate with a base unit 20 or a repeater 30 according to a specification or protocol set by the user or designer of the system 1. The communication by the specified low-power wireless communication unit 51 does not require general-purpose applicability, like general-purpose communication functions provided in the host 10, and it is sufficient to perform communication according to a specified protocol or specification within the first communication network 65 made from specified communication apparatuses 60. In the communication by the specified low-power wireless communication unit 52, it is also possible to perform communication using a protocol or specification for a specified purpose, for example, a protocol or specification that gives the highest priority to low power consumption.

The BLE communication unit 52 communicates according to a general-purpose protocol with the general-purpose Bluetooth (registered trademark) communication unit 52 that is provided in the host 10. To do so, the remote units 50 have been performing predetermined processing, such as pairing, and are capable of communication with the host 10 via the BLE communication unit 52 within a distance where BLE communication 3 is possible. On the other hand, when communicating with the general-purpose host 10, the communication by the BLE communication unit 52 is performed according to a general-purpose specification and protocol, which means that communication with the condition that the user or system 1 gives the highest priority, such as low power consumption or another purpose is not always performed.

The first communication network 65 is a network (sensor network) including sensors included in the remote unit 50 and/or sensors connected via the remote units 50. That is, when the first communication network 65 is established by the specified low-power wireless communication units 51, the first communication network 65 functions as a sensor network. In the sensor network, each remote unit 50 acquires the measurement data 59$a$ from a sensor, includes the measurement data 59$a$ in a message 2$a$, and uploads the message 2$a$ to the cloud 9 via the sensor network 65. In this processing, the functions of the BLE communication units 52 are not necessary. Accordingly, after communication via the sensor network 65 has been established, processing that stops the BLE communication units 52 to further reduce the power consumption may be performed.

The base unit 20 configures the first communication network 65 using the specified low-power wireless communication units 51 based on the first setting information 15$s$ obtained by the BLE communication units 52 and has the first communication network 65 function as a sensor network. In addition, each base unit 20 also functions as a device for uploading the messages 2$a$ including the recorded data 59$a$ uploaded from the remote units 50 using the specified low-power wireless communication 2 to a cloud service (Web Storage) server 40 on the Internet 9. Each base unit 20 includes, in addition to two types of wireless function, that is, the specified low-power (400 MHz) wireless communication unit 51 and the BLE (2.4 GHz) communication unit 52, a cloud connection unit (third communication unit or network connection unit) 21 that performs wired LAN, wireless LAN, 3G/LTE communication, or the like as a function for connecting to the Internet 9. Each base unit 20 is provided with computer resources including a memory 28 and a processor 23. The processor 23 realizes predetermined functions by downloading a program (program product) 23$a$ recorded in the memory 28, and operates as functional modules or functional units.

The processor 23 provides or includes a function as the communication network configuration unit 25 that performs the same processing as the communication network configuration units 55 of the remote units 50. The communication network configuration unit 25 provides the identification information ID of the base unit 20 to the host PC 10 via the BLE communication unit 52, which is the second communication unit. The communication network configuration unit 25 acquires the setting information 15$s$ including a frequency channel and the like for communicating with other communication apparatuses according to a communication network (virtual communication network) 15$n$ that includes a plurality of communication apparatuses 60 and is virtually constructed on the host PC 10, and configures or sets the specified low-power wireless communication unit 51, which is the first communication unit, using the setting information 15$s$. By performing this processing, each base unit 20 constructs an actual or real first communication network 65 including the repeaters 30 and the remote units 50 and makes it possible to transmit the messages 2$a$ using the specified low-power wireless communication 2 in the actual or real first communication network 65.

The processor 23 further provides or includes an upload function 26, which uploads the measurement data 59$a$ in the messages 2$a$ transmitted from the remote units 50 to the cloud 9 via the cloud connection unit 21, and a communication function 24, which calls the remote units 50 or the repeaters 30 and acquires the messages 2$a$ using the specified low-power wireless communication units 51. The communication function (communication control unit) 24 sets the specified low-power wireless communication units 51 using the setting information 15$s$ for making the sensor network 65 acquired via the BLE communication units 52 and uses the specified low-power wireless communication units 51 to communicate with the remote units 50 or the repeaters 30 to acquire the messages 2$a$.

Each repeater 30 is an apparatus used to relay the messages 2$a$ between the remote units 50 and the base unit 20 to form the sensor network 65 and thereby extends the wireless communication distance between the base unit 20 and the remote units 50. Each repeater 30 has a wireless function according to two standards, the specified low-power (400 MHz) wireless communication unit 51 and the BLE (2.4 GHz) communication unit 52. In addition, each repeater 30 includes computer resources including a memory 38 and a processor 33. The processor 33 implements predetermined functions by downloading a program (program product) 33$a$ recorded in the memory 38, and operates as functional modules or functional units. The processor 33 includes a communication network configuration unit 35 that performs the same processing as the communication network configuration units 55 of the remote units 50 and a communication function (communication control unit) 34 that communicates with the remote units 50 and the repeater 30 using the specified low-power wireless communication unit 51 to relay the messages 2$a$. The network configuration unit 35 may acquire the setting information 15$s$ for making the sensor network 65 via the BLE communication unit 52, and the communication function 34 may set the specified low-power wireless communication unit 51 using the acquired setting information 15$s$.

The host PC (host or first information processing apparatus) 10 is a personal computer, a tablet computer, a smartphone, or the like, and includes general-purpose computer resources, which include a memory 13 and a processor 11, and also resources for communication and processing. In a typical configuration, the host 10 includes a BLE (Bluetooth (registered trademark)) communication unit 52, a cloud connection unit (network connection unit) 12 that performs wired LAN, wireless LAN, 3G/LTE communication, or the like, the memory 13, the processor 11, and a user interface 14. The processor 11 implements predetermined functions by downloading a program (program product) 11a recorded in the memory 13 and operates as functional modules or functional units. The processor 11 includes a function that executes a variety of applications 19, a function 15 that virtually makes the first communication network 65 (which is a sensor network), and a function 16 that sets the setting information (first setting information) 15s, which enables the communication apparatuses 60 to communicate according to the virtually constructed first communication network 15n, in each of the communication apparatuses 60. The program 11a includes instructions for implementing these functions, and the program (program product) 11a can be provided by being recorded in a memory or another recording medium.

The function that makes a communication network (that is, the function that is configured to make the first communication network) 15 includes a function 15a that displays a plurality of icons that represent the plurality of communication apparatuses 60, and a function 15b that enables the virtual communication network 15n to be made, constructed or configured with a plurality of icons by dragging and dropping the plurality of icons.

Figure 2:
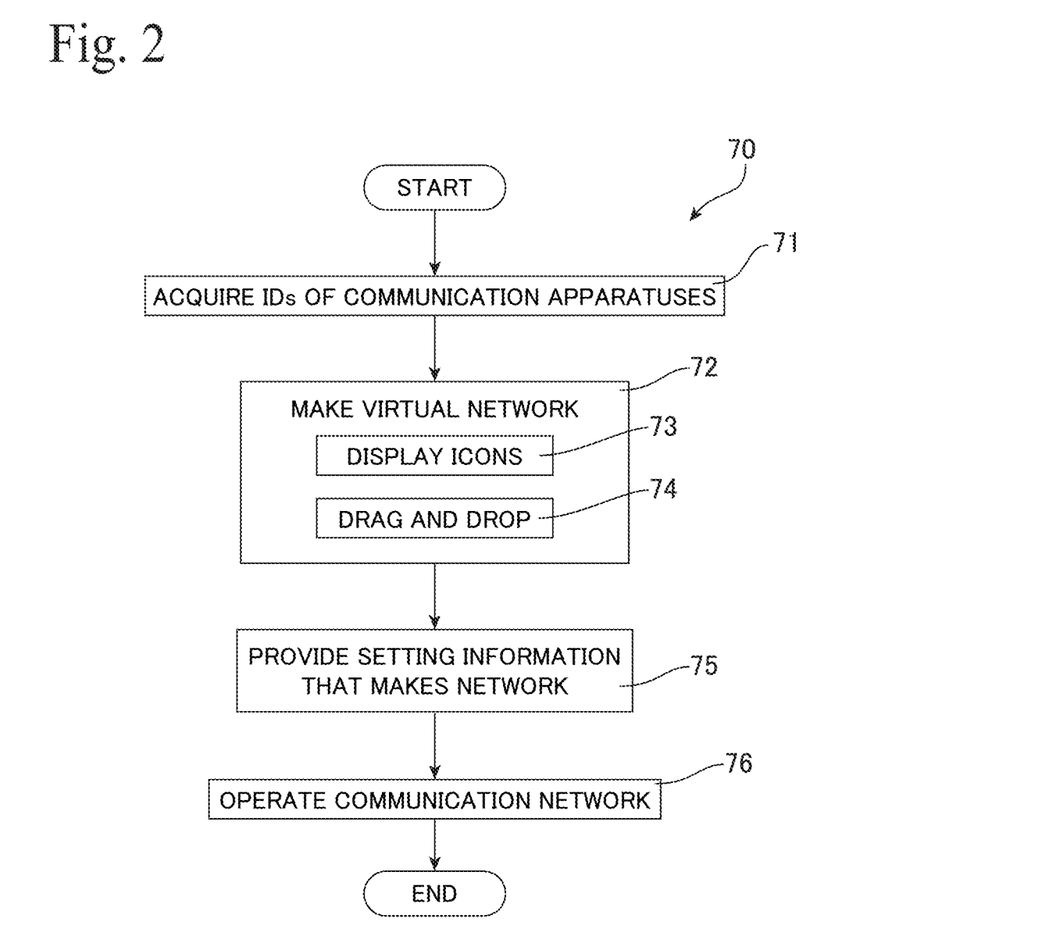
FIG. 2 is a flowchart depicting a process that makes a network.

FIG. 2 depicts a process including step 70 of making a communication network (first communication network or sensor network) 65 with the communication apparatuses 60, which include the base units 20, the repeaters 30, and the remote units 50, inside the host PC 10. In step 71, the host 10 communicates with a plurality of communication apparatuses 60 that are present in the communication range of BLE from the host 10 and have performed the processing required to start communication, such as pairing. The host 10 and the plurality of communication apparatuses 60 communicate substantially in parallel via the BLE communication unit 52 and acquire the identification information (plurality of sets of identification information) IDs of the respective communication apparatuses 60, that is, the base units 20, the repeaters 30, and the remote units 50. The identification information IDs may include the types of communication apparatuses 60, as examples, "base unit 20", "repeater 30", and "remote unit 50", and may also include the types of sensors 59 and the like built into each remote unit 50.

In this step 71, it is sufficient for the BLE communication unit 52 to collectively receive the identification information IDs of the plurality of communication apparatuses 60 that make the communication network 65. Accordingly, for the plurality of communication apparatuses 60 that make the wireless network 65 or are candidates for making the wireless network 65, it is sufficient to perform communication with the communication apparatuses 60 at time intervals that do not interfere with the process of making or configuring the virtual network on the host 10, and it is not always necessary to communicate with the communication apparatuses 60 exactly at the same time. In this step and in subsequent processing, the communication 3 using the BLE communication unit 52 may be performed between the communication apparatuses 60 in parallel, intermittently, or sequentially, or in other words, substantially in parallel to an extent where the user can receive and/or handle (operate) the information of the communication apparatuses 60 at almost the same time on the host PC.

In step 72, a communication network that includes a plurality of communication apparatuses 60 is virtually made on the host 10 by using the identification information IDs of the communication apparatuses 60 that have been acquired via the BLE communication units 52. This step 72 includes a step 73 that displays a plurality of icons indicating a plurality of communication apparatuses 60 on a user interface (UI) 14, such as a display or a touch panel of the host 10, and a step 74 that enables the virtual communication network 15n to be made or configured with a plurality of icons by dragging and dropping the plurality of icons.

Figure 3:
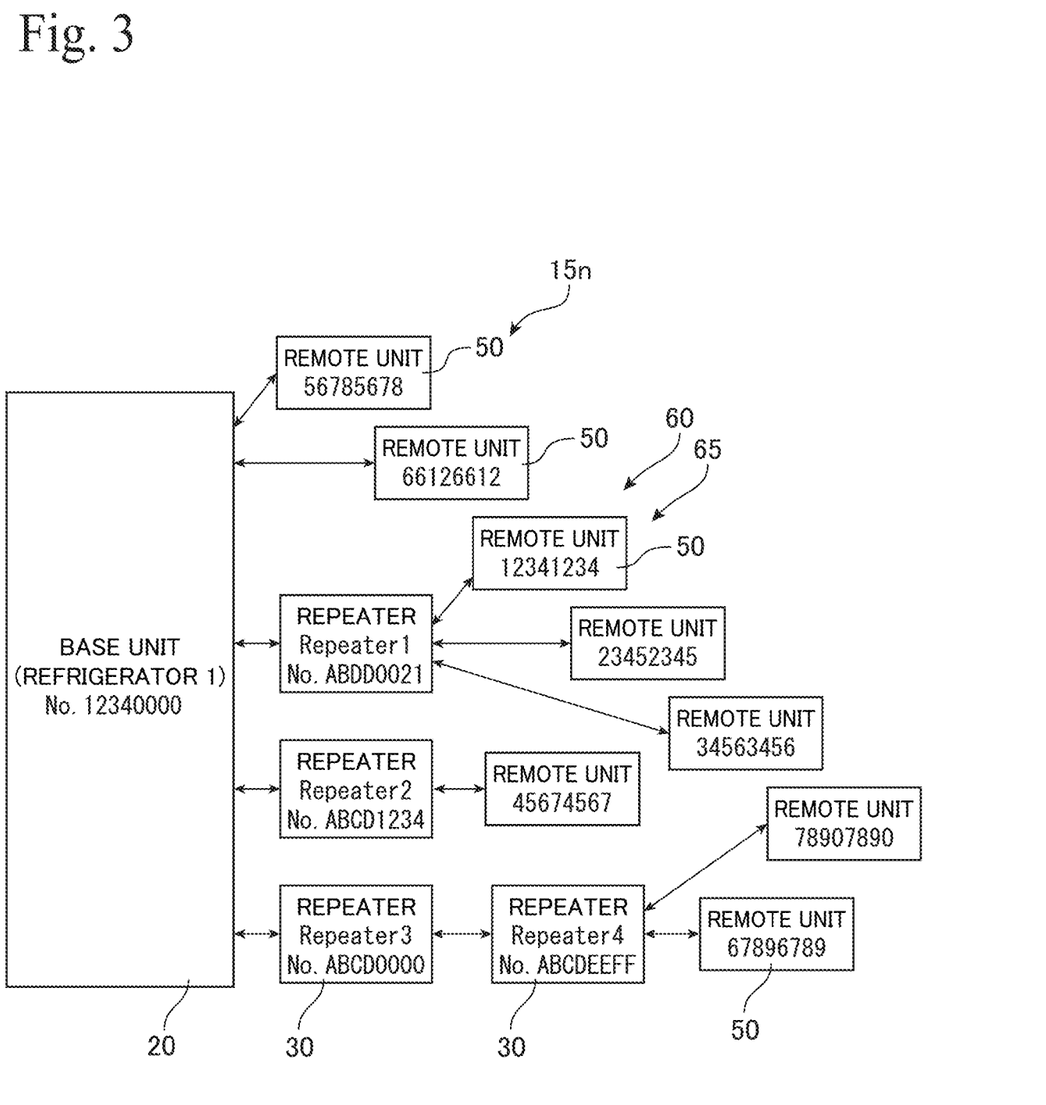
FIG. 3 is a diagram depicting one example of a virtual network.

FIGS. 3 to 6 depict examples where a virtual network 15n is made or configured using the UI 14, for example, a touch panel. In this example, as depicted in FIG. 3, a virtual communication network 15n for measuring the temperatures inside a refrigerator (refrigerated storage) is configured by a plurality of communication apparatuses 60, and an actual communication network (sensor network) 65 is made by providing (supplying or feeding back) such information to a base unit 20 to set the base station 20 using the information. A communication network (sensor network) 65 may also be made by providing (supplying or feeding back) the information to each of the other communication apparatuses 60 in addition to the base unit 20 and setting the respective communication apparatuses 60 using the information.

Figure 4:
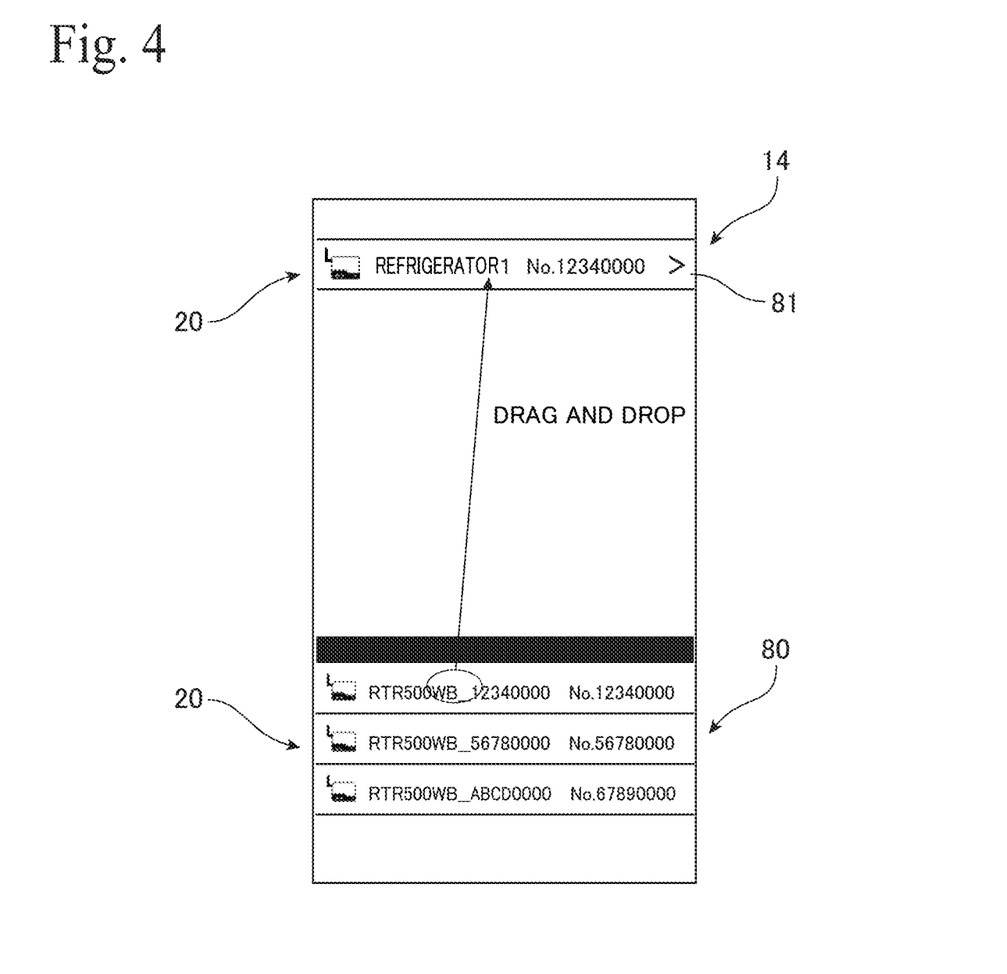
FIG. 4 is a diagram depicting one example of a process that makes a virtual network.
Figure 5:
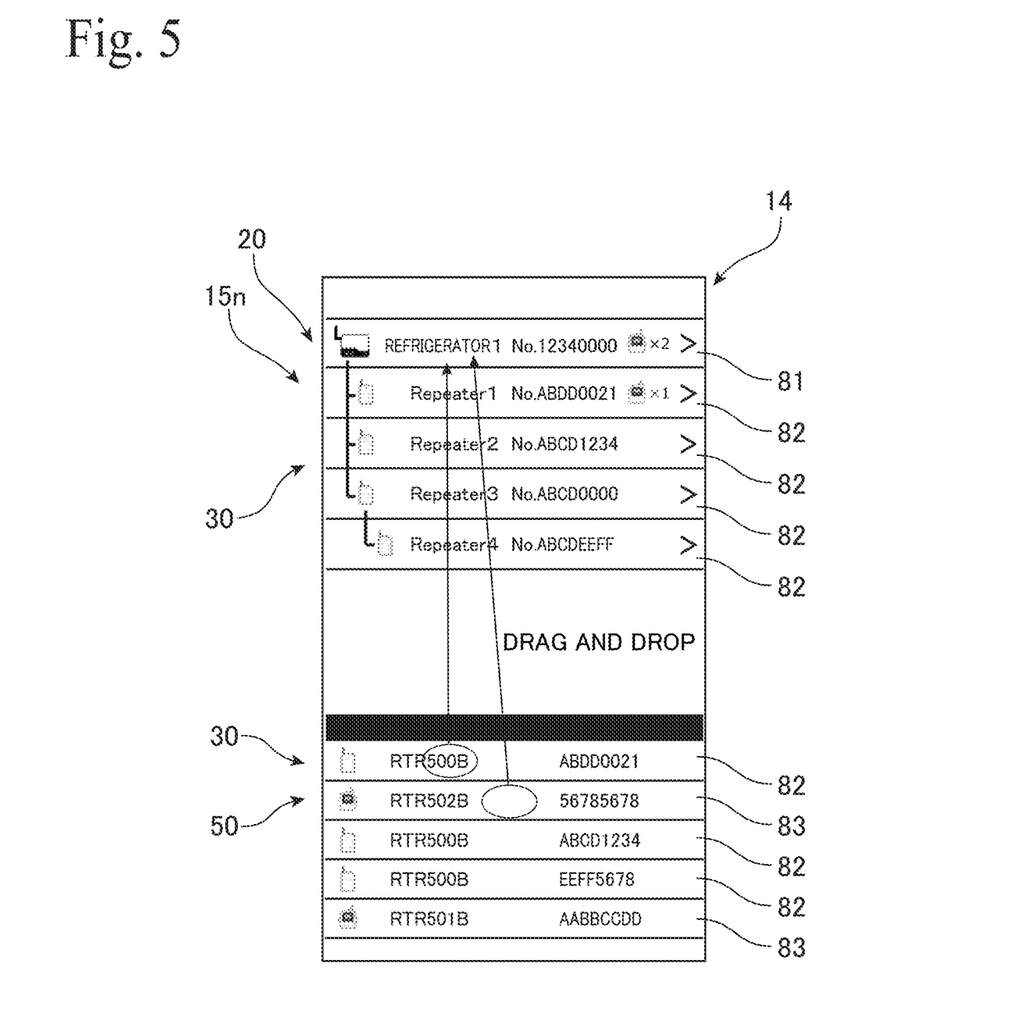
FIG. 5 depicts a process that makes the virtual network as a continuation of FIG. 4.

First, as depicted in FIG. 4, when "12340000" is selected out of the IDs of the plurality of base units 20 displayed on the touch panel 14, an icon 81 of the base unit is displayed on the touch panel 14 as the base unit (master unit) 20 of the network 15n for measuring temperatures in the refrigerator. Next, as depicted in FIG. 5, the repeaters 30 and remote units 50 that are to directly communicate with the base unit 20 are selected out of the plurality of repeaters 30 and remote units 50 displayed on the touch panel 14, and the selected repeaters 30 and remote units 50 are dragged and dropped onto the icon 81 of the base unit 20.

As one example, icons (indicated as "Repeaters 1 to 3") 82 of three repeaters 30 and icons 83 of two remote units 50 are dragged and dropped onto the icon 81 of the base unit 20. By performing this operation, a network in which the repeaters 30 and the remote units 50 are directly connected to the base unit 20 (without a repeater in between) is configured. The icons 83 of three remote units 50 are dragged and dropped onto the icon 82 of the repeater 30 that has been connected to the base unit 20. By performing this operation, the repeater 30 and the remote units 50 are directly connected (that is, without another repeater in between), and the network in which the remote units 50 are connected to the base unit 20 via the repeater 30 is made or configured.

It is also possible to drag and drop the icon 82 of another repeater 30 onto the icon 82 of the repeater 30 that has been connected to the base unit 20 and then drag and drop the icons 83 of two remote units 50 onto the icon 82 of this another repeater 30. By performing this operation, the network in which the remote units 50 are connected to the base unit 20 via the two repeaters 30 is made.

Figure 6:
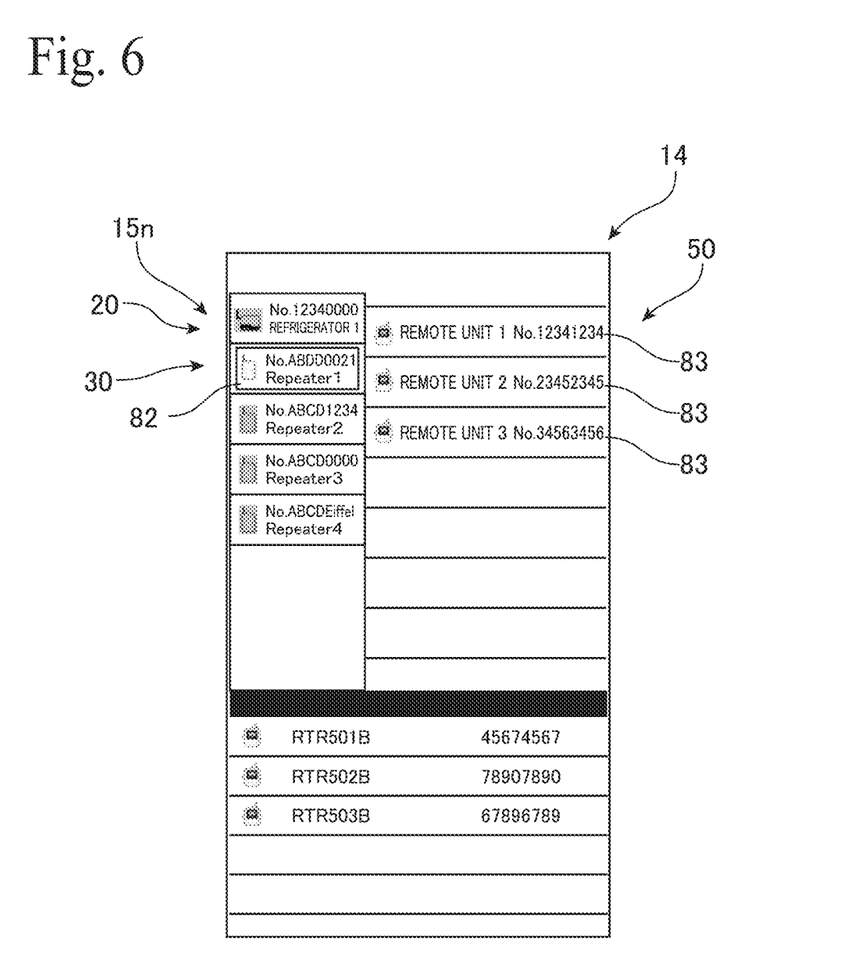
FIG. 6 depicts a process that makes the virtual network as a continuation of FIG. 5.

FIG. 6 depicts checking of the configuration of part of the network 15n that has been virtually made as described above. As one example, the drawing depicts a state where icons 83 indicating three remote units 50 are connected to the icon 82 of the repeater 30 connected to the base unit 20, and thereby depicts how a network in which the three remote units 50 are connected to the repeater 30 is made.

Returning to FIG. 2, when the virtual network 15*n* has been finally made or configured in step 74, in step 75, the setting information (first setting information) 15*s* for communicating with other communication apparatuses via the specified low-power wireless units (first communication units) 51 according to the virtual communication network 15*n* is provided to the base unit 20 via the BLE communication unit (second communication unit) 52. In step 76, the base unit 20 communicates with the repeaters 30 and the remote units 50 based on the routing information of the communication network 15*n* included in the setting information 15*s*. The communicated repeater 30 communicates with one or more downstream repeaters 30 and/or remote units 50 according to the setting information 15*s* including the routing information supplied from the base unit 20 together with the communication. The remote units 50 and the repeaters 30 transmit the messages 2*a* including the measurement data 59*a* to the repeaters 30 or the base unit 20 described above according to the setting information 15*s* including the routing information received from the base unit 20. In this way, the plurality of communication apparatuses 60 included in the communication network 15*n* virtually made at the host PC 10 make or establish the first communication network 65 with the specified low-power wireless units (first communication units) 51 and operate in real space.

In step 75, it is possible to provide the first setting information 15*s* to each of the plurality of communication apparatuses 60 included in the communication network 15*n* and to set the communication conditions of the specified low-power wireless unit (first communication unit) 51 for each of the communication apparatuses 60. By performing this processing, the conditions for operating the first communication network 65 composed of the plurality of communication apparatuses 60 in the real space are established. In step 76, as one example, it is possible to notify, via the BLE communication units 52, the plurality of communication apparatuses 60 including the base unit 20, the repeaters 30, and the remote units 50 of the start of processes that perform measurement using the sensors 59 and transmit the messages 2*a* including the measurement data 59*a*. By doing so, the base unit 20, the repeaters 30, and the remote units 50 belonging to the communication network 65 can start communication using the specified low-power wireless units 51 and operate the communication network 65. Here, it is sufficient for the BLE communication units 52 to be capable of collectively distributing the setting information 15*s* for starting communication using the wireless network 65 to the plurality of communication apparatuses 60, and to be capable of accessing the plurality of communication apparatuses 60 substantially in parallel.

Note that although an example where specified low-power wireless communication (400 MHz) is used as an example of the first communication units (first wireless units) 51 that make the communication network 65 between the plurality of communication apparatuses (wireless apparatuses) 60 has been described in the present embodiment, it is also possible to use specified low-power wireless communication (900 MHz) or communication units that use another communication method capable of low power communication, such as ZigBee (registered trademark). The remote units 50 and the repeaters 30 may be battery operated, and it is desirable for the communication to have low power consumption. Accordingly, the first communication unit 51 may be a communication unit that is not installed at the host PC 10 as standard, and may be a communication unit that is easy to customize and makes it easy to reduce power consumption.

Although an example where BLE communication units are used as the second communication units 52 that connect to the host PC 10 has been described above, the second communication units 52 may be another general-purpose communication units, such as communication units that are installed as standard in the host PC 10, for example, wireless LAN units. Also, although a sensor network in which the remote units 50 have built-in sensors and/or are connected to sensors has been described above as an example, the remote units 50 may be internally provided with a function as the repeater 30. The present invention can be applied not only to a sensor network but also to a communication network including terminals that perform communication using a different multi-hop wireless communication method.

Although specific embodiments of the present invention have been described above, various other embodiments and modifications will be conceivable to those of skill in the art without departing from the scope and spirit of the invention. Such other embodiments and modifications are addressed by the scope of the patent claims given below, and the present invention is defined by the scope of these patent claims.

The invention claimed is:

1. A method comprising:
generating a first sensor network of a plurality of first communication apparatuses selected from a plurality of communication apparatuses, the plurality of communication apparatuses respectively including a plurality of first communication units to transmit communication messages to form the first sensor network and a plurality of second communication units which are general-purpose communication units, the plurality of first communication units performing communication determined independently from the general-purpose communication units, and
the plurality of first communication apparatuses forming the first sensor network including at least one base unit and one or more remote units each of which includes a sensor that acquires measurement data or an interface for the sensor,
the generating of the first sensor network including steps of:
acquiring, by an information processing apparatus which includes a processor and is provided separately from the first sensor network, identification information of the plurality of communication apparatuses via the plurality of second communication units;
selecting, on the information processing apparatus, the plurality of first communication apparatuses including the at least one base unit and the one or more remote units among the plurality of communication apparatuses, using the acquired identification information of the plurality of communication apparatus;
generating first setting information for each of the selected plurality of first communication apparatuses for forming the first sensor network via the respective first communication units; and
transmitting the generated first setting information from the information processing apparatus to the respective second communication units of the selected plurality of first communication apparatuses, such that the selected plurality of first communication apparatuses are configured to communicate with each other using the respective first communication units to form the first sensor network.

2. The method according to claim 1, wherein the first communication units, which use communication determined independently from the general-purpose communication units, are specified low-power wireless communication units.

3. The method according to claim 1, wherein the plurality of communication apparatuses include a base unit, a remote unit, and a repeater configured to relay data between the base unit and the remote unit, and
the selecting, on the information processing apparatus, of the plurality of first communication apparatuses among the plurality of communication apparatuses includes selecting at least one of the base unit, at least one of the remote unit, and at least one of the repeater.

4. The method according to claim 3, wherein:
the base unit includes a third communication unit configured to connect to a server, and
the method further comprises transmitting the measurement data acquired from the one or more remote units to the at least one base unit via the first sensor network using the respective first communication units, and uploading the measurement data to the server via the third communication unit of the at least one base unit.

5. The method according to claim 1, wherein the plurality of second communication units are Bluetooth Low Energy (BLE) communication units.

6. The method according to claim 1, wherein:
the base unit includes a third communication unit configured to connect to a server, and
the method further comprises transmitting the measurement data acquired from the one or more remote units to the at least one base unit via the first sensor network using the respective first communication units, and uploading the measurement data to the server via the third communication unit of the at least one base unit.

7. The method according to claim 1, wherein
the method further comprises, after the first sensor network is formed, the communication between the information processing apparatus and each of the respective second communication units of the plurality of first communication apparatuses forming the first sensor network is stopped.

8. A non-transitory computer readable storage medium storing a computer executable program for controlling an information processing apparatus configured to select a plurality of first communication apparatuses among a plurality of communication apparatuses to form a first sensor network, the plurality of communication apparatuses respectively including a plurality of first communication units that transmit communication messages to form the first sensor network and a plurality of second communication units which are general-purpose communication units, the plurality of first communication units being communication determined independently from the general-purpose communication units, and
the plurality of first communication apparatuses forming the first sensor network including at least one base unit and one or more remote units each of which includes a sensor that acquires measurement data or an interface for the sensor,
the information processing apparatus including a processor and being separately provided from the first sensor network, the computer executable program comprising computer-executable instructions that cause the information processing apparatus to execute:
acquiring of identification information of the plurality of communication apparatuses via the plurality of second communication units;
selecting the plurality of first communication apparatuses including the at least one base unit and the one or more remote units among the plurality of communication apparatuses, using the acquired identification information of the plurality of communication apparatuses;
generating first setting information for each of the selected plurality of first communication apparatuses for forming the first sensor network via the respective first communication units; and
transmitting the generated first setting information from the information processing apparatus to the respective plurality of second communication units of the selected plurality of first communication apparatuses, such that the selected plurality of first communication apparatuses are configured to communicate with each other using the respective first communication units to form the first sensor network.

9. A system comprising:
a plurality of communication apparatuses respectively including a plurality of first communication units to transmit communication messages to form a first sensor network and a plurality of second communication units, wherein
the plurality of second communication units are general-purpose communication units, and the plurality of first communication units perform communication determined independently from the general-purpose communication units, and
the plurality of first communication apparatuses forming the first sensor network include at least one base unit and one or more remote units each of which includes a sensor that acquires measurement data or an interface for the sensor; and
an information processing apparatus including a processor and being provided separately from the first sensor network, the information processing apparatus being configured to connect to the plurality of communication apparatuses respectively using the plurality of second communication units, the information processing apparatus being configured to perform:
acquiring identification information of the plurality of communication apparatuses via the plurality of second communication units;
selecting the plurality of first communication apparatuses including the at least one base unit and the one or more remote units among the plurality of communication apparatuses, using the acquired identification information of the plurality of communication apparatuses;
generating first setting information for each of the selected plurality of first communication apparatuses for forming the first sensor network via the respective first communication units; and
transmitting the generated first setting information from the information processing apparatus to the respective second communication units of the selected plurality of first communication apparatuses, such that the selected plurality of first communication apparatuses are configured to communicate with each other using the respective first communication units form the first sensor network.

10. The system according to claim 9, wherein:
the plurality of communication apparatuses include a base unit, a remote unit, and a repeater configured to relay data between the base unit and the remote unit, and
the selecting of the plurality of first communication apparatuses among the plurality of communication apparatuses includes selecting at least one of the base unit, at least one of the remote unit, and at least one of the repeater.

11. The system according to claim 10, wherein:
the base unit includes a third communication unit configured to connect to a server, and
the measurement data acquired from the one or more remote units is transmitted to the at least one base unit via the first sensor network using the respective first communication units, and the at least one base unit uploads the measurement data to the server via the third communication unit.

12. The system according to claim 9, wherein:
the plurality of first communication units perform specified low-power wireless communication, and
the plurality of second communication units perform Bluetooth Low Energy (BLE) communications.

13. The system according to claim 9, wherein:
the base unit includes a third communication unit configured to connect to a server, and
the measurement data acquired from the one or more remote units is transmitted to the at least one base unit via the first sensor network using the respective first communication units, and the at least one base unit uploads the measurement data to the server via the third communication unit.

14. A communication apparatus comprising:
a first communication unit that transmits communication messages to other communication apparatuses of a plurality of communication apparatuses to form a sensor network;
a second communication unit, which is a general-purpose communication unit, configured to connect to an information processing apparatus, which includes a processor is provided separately from the sensor network, the first communication unit performing communication determined independently from the general-purpose communication unit; and
a communication network configuration unit configured to:
transmit identification information of the communication apparatus to the information processing apparatus using the second communication unit,
acquire, from the information processing apparatus, first setting information for communicating with the other communication apparatuses to form the sensor network, the first setting information being based on the communication apparatus being selected on the information processing apparatus to form the sensor network, and
set the first setting information in the first communication unit to form the sensor network,
wherein the communication apparatus and the other communication apparatuses forming the sensor network include at least one base unit and one or more remote units each of which includes a sensor that acquires measurement data or an interface for the sensor.

\* \* \* \* \*